Inventor
George Schulz
By Lloyd W. Patch
Attorney

Patented June 15, 1937

2,083,964

UNITED STATES PATENT OFFICE 2,083,964

LIQUID DISPENSING DEVICE

George Schulz, Chicago, Ill., assignor to E. Edelmann & Co., Chicago, Ill., a corporation of Illinois Application August 1, 1935, Serial No. 34,273

12 Claims. (Cl. 221—74)

My invention relates to air operated liquid dispensing devices, and particularly to a balanced air operated pump structure intended and adapted for use in withdrawing and dispensing alcohol, oil, fuel liquid and other liquids from metal drums, cans, barrels, tanks, or other like closed containers.

An object of my invention is to provide a device structure which can be used in automobile service stations, in boats, and in any and all places where a supply of air under pressure is available, and which will automatically function and operate uniformly and efficiently, and with a predetermined low pressure within the drum, can, barrel, tank or other container, irrespective of the air pressure from the source of supply.

Another object is to so construct the parts that the device can be fitted for use upon ordinary and standard forms and types of drums, cans, barrels, tanks and other containers in which alcohol, oil, fuel liquid and other liquids are stored and handled, and with which the entire contents of the container can be withdrawn at any time and in any quantity desired and under a uniform predetermined pressure.

A further object is to so construct the parts that the device will operate on a predetermined low pressure, to thus positively preclude the possibility of excessive pressure to expand the heads or burst or otherwise damage the container, and with which excessive pressure due to any cause is positively prevented.

Still another object is to provide a device supplying to a manually manipulated dispensing cock, or other draw-off or discharge, under a uniform low pressure so that splashing, bubbling, gurgling, or other objectionable effects, and fast and slow or other illy regulated flow, due to excessively high or low pressures, will not occur.

With the above and other objects and purposes in view, which will be apparent to those skilled in the art, my invention includes certain novel features of construction and combination and assembly of parts, which will be hereinafter set forth in connection with the drawings and then pointed out in the claims.

Figure 1:
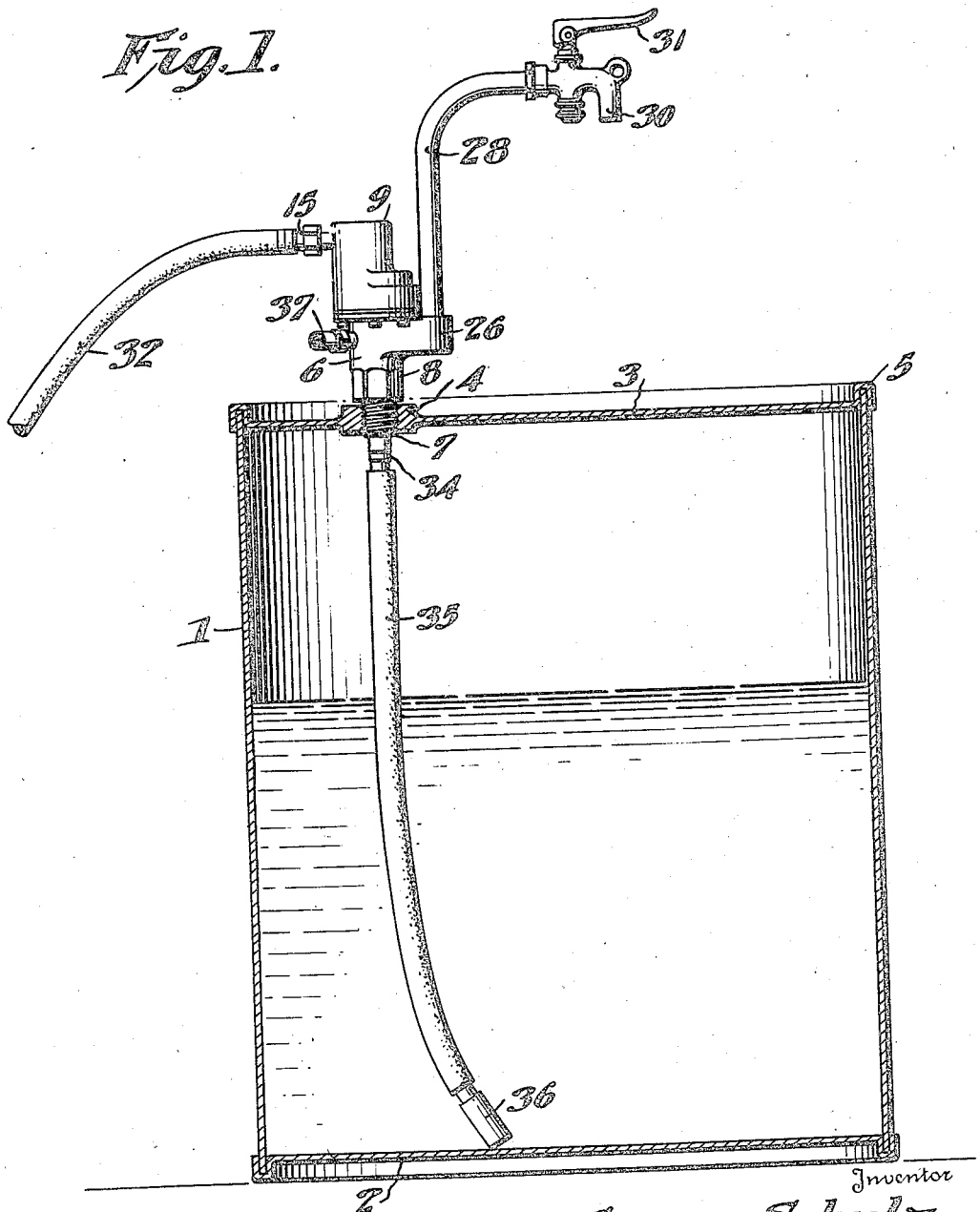
Figure 1 is a view in elevation, and partly in section, showing my invention as it is applied and installed for use with a liquid container.
Figure 2:
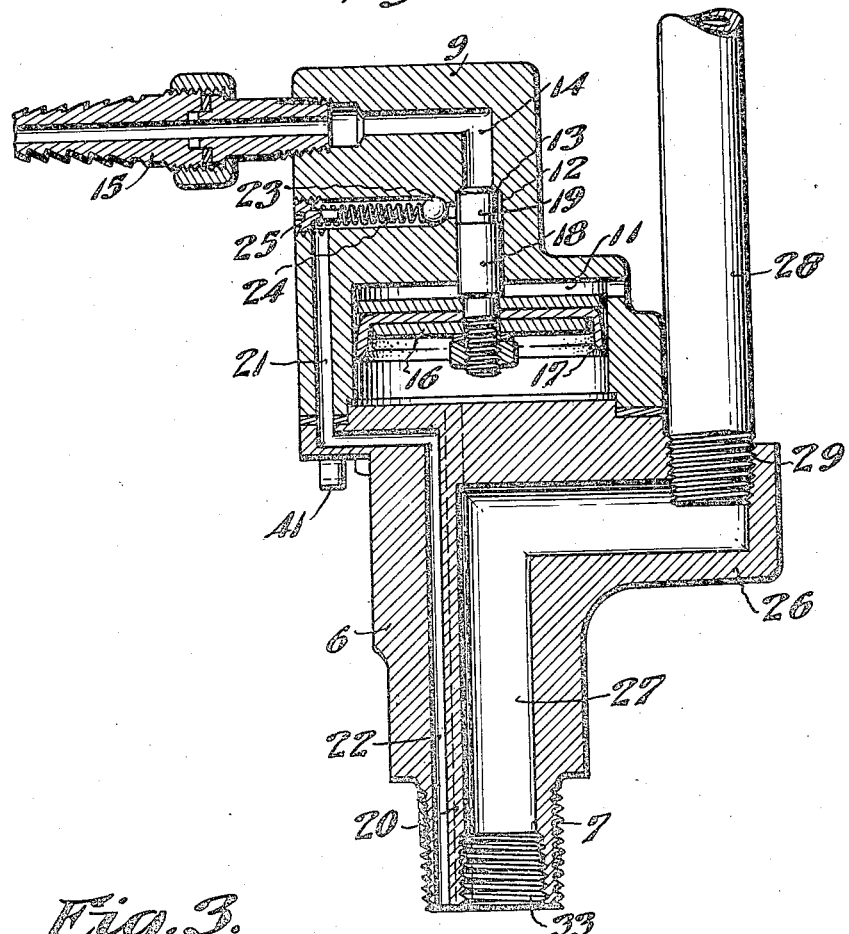
Fig. 2 is an enlarged fragmentary sectional view taken vertically through the casing to better show the operating parts of the pump.
Figure 3:
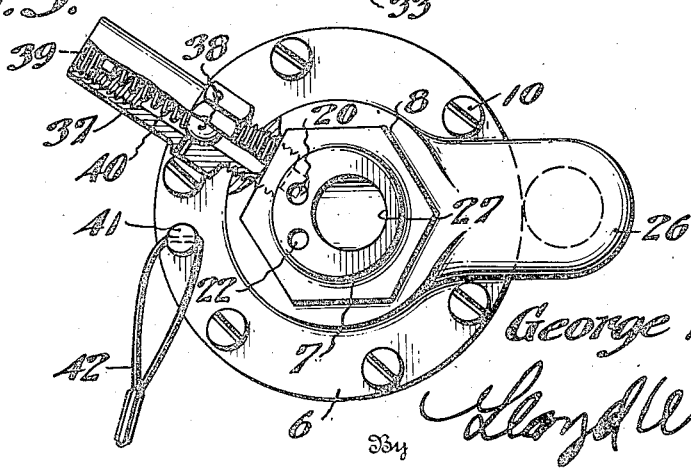
Fig. 3 is a view looking upwardly at the lower end of the casing, and with parts in section.

In Figures 1, 2 and 3 of the drawings I have illustrated an embodiment of my invention intended and adapted for use in withdrawing alcohol or other liquid from a closed container of the barrel or drum type.

Various forms and types of air lift and air pressure devices have heretofore been used in the handling of liquids, and air pressure pumps or dispensing systems have been employed to dispense alcohol and other liquids from drums, cans, barrels, tanks, and other containers in which the liquid is ordinarily handled or stored. However, previous attempts have depended upon the building up of a pressure within the closed container in excess of the exact requirements for immediate use, so that a reserve of air pressure will be available for further dispensing operation. This building up or accumulation of an excessive pressure within the drum, can or container has proved most unsatisfactory and dangerous, since excessively high pressure will cause a gushing flow with accompanying splashing and spilling of the liquid, whereas excessively low pressure will be insufficient to dispense the liquid in the desired quantity flow. Aside from the lack of uniformity of flow of the liquid as dispensed, the building up of a high pressure within the container will cause bulging of the heads or other portions and other damage, and will possibly result in dangerous and destructive explosions.

With the objections in the use of air equipment for dispensing liquids seemingly insurmountable, attempts have been made to devise some form of pump which can be used in dispensing alcohol at a service station, and in dispensing any and all kinds of liquids at service stations and in other places. Mechanical or suction pumps have been found unsatisfactory since no way has been discovered to provide an inexpensive pump mechanism that will retain its prime and will operate efficiently to at all times supply an even flow of liquid. As access can be had to the interior of the drum, can or barrel ordinarily only through a restricted opening, it has been impossible to use a pump having parts below the liquid level to obviate the necessity for maintaining a constant prime, and the situation is further complicated by reason of the fact that the liquids desired to be dispensed ordinarily are destructive to the usual piston and pump packing materials.

In the present instance I have devised and developed an air operated liquid device which functions efficiently and continuously at a uniform low pressure, and with which no working or operating parts and no pump or packing structures or materials can in any way be exposed to contact or the destructive effects of alcohol, oil or other liquids being dispensed. Further, with the operating pressure maintained very low, from two to four pounds pressure to the square inch being sufficient for alcohol and like liquids, the drum, can, barrel, or other container will not be bulged and the possibility of bursting or explosions is negatived.

In the present illustration I have shown my improved device fitted for use with a closed drum, barrel or other container of the type in which alcohol and other liquids are commercially handled, and from which drum or barrel the liquid is most satisfactorily dispensed in such quantities as may be desired.

The drum 1 is shown as being of the usual cylindrical form and is provided with the heads or ends 2 and 3. The head 3 has an opening at one end fitted with the usual internally screw threaded sleev or bushing 4. Ordinarily, this sleeve or bushing 4 is located at one side of the head, and as the chime 5 extends around this head, the head or top 3 provides an ideal surface or support upon which to rest a measure or other container into which the liquid is to be dispensed. The pump base 6 is provided with an externally screw threaded portion 7 adapted to be turned into the threaded opening of the bushing or sleeve 4, a polygonal portion 8 being preferably provided upon the casing to receive a wrench or other tool by which the casing is screwed into place to accomplish an airtight connection. A leakproof connection is further insured by the fact that ordinarily the bushing and the end 7 of the pump base will be provided with pipe threads. The pump base has a pump case 9 secured and mounted thereon through the medium of screws 10, or other suitable fastenings, and this pump case is provided with a cylindrical opening 11. A valve bore 12 is provided in the pump case 9 axially in line with the cylindrical opening 11, and this valve bore terminates in a tapered seat 13. An air supply passage 14 opens through the tapered valve seat 13, and a hose nipple 15 is connected in communication with this air supply passage 14.

A piston 16 within the cylindrical opening 11 is provided with a packing 17 to prevent ready passage of air upwardly past the piston, and a stem 18 associated with the piston and slidably received in the valve bore 12 has a valve portion 19 thereon to close against the tapered valve seat 13 when pressure is applied on the lower side of the piston 16. An air passage 20 leads from the lower end of the pump base member 6 upwardly to the cylindrical opening 11 to thus establish communication from the drum or container 1 to this cylindrical opening 11 below the piston 16.

An air passage 21 extends through the pump casing 9 and connects with an air passage 22 formed through the pump base member 6 and extending to open through the extremity of the screw threaded portion 7 and thus directly in communication with the interior of the drum or container 1. A check valve 23 is provided in the passage 21 to prevent back flow of air from the passage 22 through the passage 21, a spring 24 and plug 25 serving to hold the valve normally in closed position.

The pump base is provided with a lateral extension 26 disposed to clear the top 3 of the drum 1, and has a liquid conducting passage 27 extending from the end of the externally threaded portion 7 upwardly and then through the lateral extension and entirely out of direct communication with either of the passages 20 or 22. A liquid dispensing pipe 28 is mounted in a threaded opening 29 formed in the lateral extension 26, the pipe 28 being thus in direct communication with the liquid supply passage 27. It is perhaps preferable that the faucet be of the type automatically closing when manually released, although it will be appreciated that any type of cock or faucet or other vave or draw-off can be employed.

My improved pump structure is adapted to operate upon compressed air from any suitable source of supply, and will function efficiently, for the reasons to be hereinafter more fully set forth, irrespective of the pressure of the air. In the present instance I have shown a compressed air supply hose 32 connected with the hose nipple 15, and this hose 32 can receive compressed air from the usual air compressing unit as now ordinarily used in automobile service stations, or from any other suitable and available source.

The lower end of the passage 27 is internally screw threaded, as at 33, and a hose connecting nipple 34 is turned into this screw threaded portion. A rubber hose, or other flexible conduit pipe or tube portion 35 is connected with the nipple 34, and where an ordinary rubber hose or other collapsible tubing is used it may be found desirable to provide a tubular intake fitting 36 at the lower end of the hose 35. The purpose of the parts 34, 35 and 36 is to provide a liquid intake for the pump that reaches substantially to the bottom of the drum, barrel, can or other container, and obviously these parts can be varied in their form and fitting almost without limit.

While the operation and the functioning of the parts is automatic to insure that a low pressure will be attained and maintained in the drum or container, irrespective of the pressure of the air supplied through the hose 32 and irrespective of other conditions; emergencies may arise, as for instance ingress of grit particles or other dirt to prevent closing of the valve 19 properly into its seat 13, or other conditions preventing complete and proper automatic operation and functioning of the parts, and it is therefore desirable that some means be provided to positively prevent creation of excess pressure within the drum or container 1. To this end, I provide a valve casing 37 on the pump base 6 in communication with the air passage 20, and in this valve casing mount an air escape valve 38. The pressure at which this valve will open can be adjusted through manipulation of the screw threaded plug 39 to adjust the pressure of spring 40 acting to hold the valve 38 in its closed position.

While the fastenings 10 will hold the parts 6 and 9 secured together, and these fastenings will clamp a packing ring between the adjacent faces of the two parts, to thus insure fluid tight joints at all points it may be desirable to provide means to positively lock or seal the parts to prevent opening and tampering with the internal mechanism. With this in mind, I provide a stud or pin 41 upon the lower face of the pump casing 9 to fit through a registering opening in the securing flange of the base 6. This pin or stud has an opening therethrough and a wire and lead seal 42, or any other suitable and desirable seal or fastening means can thus be placed to positively seal the casing 9 to the base so that it cannot be removed without showing evidence of such removal.

In use, my improved pump structure is mounted upon or associated with a drum, can, barrel, or any other closed liquid container, and as air is supplied through hose 32 under pressure, this pressure air flows through passage 14 to exert pressure against the upper end of valve portion 19. The stem 18 is thus moved downwardly, carrying piston 16 therewith, and the pressure air then forces past the check valve 23 and flows through communicating passages or ducts 21 and 22 to discharge into the drum or container. The passage or duct 20 establishes communication from the upper part of the container directly into the cylindrical opening 11. Depending upon the depth of the container, the viscosity of the liquid and other factors, a suitable air pressure in the upper part of the container will exert a head pressure upon the liquid to initiate flow through the tube 35 and then through passage 27 and into discharge pipe 28 controlled by the cock or valve 30. When the handle 31 is manipulated to open the valve the liquid will flow from the nozzle thereof, and the pressure of air from the upper part of the container will maintain a continuous flow.

To avoid a gushing flow of the liquid, to prevent injury or damage to the container, and for other reasons and purposes, it is desirable that the liquid be dispensed from the nozzle of the valve 30 under low pressure, and as the supply of pressure air through the pipe 32 will ordinarily be under high pressure, it is necessary to considerably reduce the pressure of air between the pipe 32 and the discharge through the passage or duct 22 into the container. For dispensing a liquid such as alcohol, it has been found that a pressure of between two and four pounds to the square inch is sufficient, and I therefore regulate and govern and proportion the ratio of the surface of the piston 16 with respect to the surface area of the valve portion 19 exposed to the pressure air, so that when the pressure within the upper part of the container reaches four pounds the pressure against piston 16 will cause the stem 18 to be moved upwardly to seat the valve portion 19, and when the pressure within the container falls to say two pounds, the valve will be again unseated to permit a flow of pressure air to again raise the pressure within the container. Immediately the valve handle 31 is manipulated to open the valve, liquid will be discharged and in consequence the air pressure within the container will begin to lower. At the minimum low for which the valve is proportioned, the pressure against the end of the valve overcomes the pressure upon the piston, and thus the valve or pump mechanism operates automatically to insure and maintain a constant air pressure in the upper part of the container, which air pressure will vary between the maximum and minimum determined by the proportioning of the valve and piston.

The pump can be manufactured and regulated to handle any liquid, and to operate at any pressure desired, and the use and operation will be substantially as set forth.

The emergency or safety valve 37 can be set to open and blow off at any desired pressure, and in the use of the pump with alcohol where the working pressure is maintained between two pounds and four pounds, it may be found desirable to set this emergency valve to blow off when a pressure of five pounds has been attained in the container.

In the foregoing I have described the use of my air operated pump in connection with a barrel, drum, or other similar tank, but it will be appreciated that the pump structure can be employed to draw liquid from a fuel tank or a submarine or other boat or ship, from a fuel tank supplying to a combustion engine or a burner or any other structure, and in substantially any and all places and connections where it is desired to draw liquid from a closed tank or container.

Figure 4:
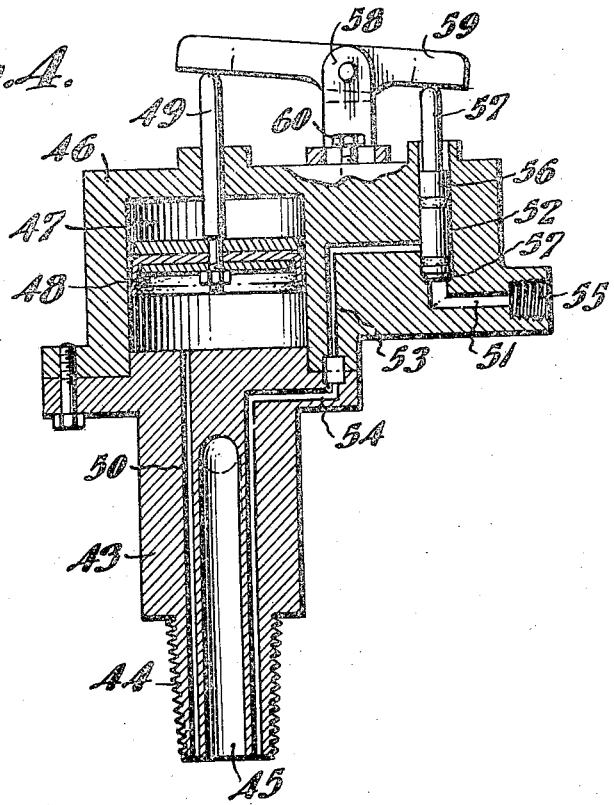
Fig. 4 is a vertical sectional view through a modified construction.
Figure 5:
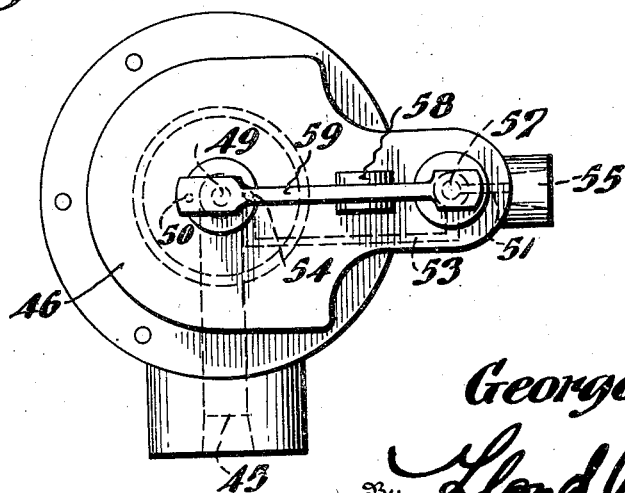
Fig. 5 is a top plan view of the form shown in Fig. 4.

The modified construction as illustrated in Figs. 4 and 5 can be installed and used in the manner specifically illustrated in Figure 1, or in any other place or adaptation. With this modified construction, the pump base 43 is constructed to be somewhat similar to the above described pump base 6, and is provided with an externally screw threaded portion 44 to permit mounting in an internally screw threaded sleeve or bushing, or in any other internally threaded opening. This pump base has a liquid passage 45 formed therethrough and a hose or tube can be connected with this passage 45 and have its intake end submerged in the liquid within the container. A pump case 46 is mounted and secured upon the pump base 43, and this case 46 has a cylindrical opening 47 therein, a piston 48 being mounted for reciprocatory movement within the cylindrical opening 47 and having a stem 49 extending therefrom. An air passage 50 is provided through the base member 43 to establish communication from the interior of the container to the cylindrical opening 47 on the forward side of piston 48.

A pressure air passage 51 is provided in the pump case 46 and leads to a valve cylinder 52. Air passages 53 and 54, in the pump case 46 and the pump base 43 lead from the valve cylinder 52 to open through the lower end of the portion 44 and thus discharge into the container with which the pump structure is associated. A compressed air supply hose, pipe, or other conduit or structure to supply compressed air, is connected with the pressure air passage 51, at 55. A reciprocating piston valve 56 is mounted for reciprocatory movement within the valve cylinder 52, and at its end 57 is constructed to close within a corresponding valve seat from the pressure air passage 51. The air passage 53 is in communication with the valve cylinder 52 so that as valve 56 is unseated by the force or pressure exerted against its end 57, by the pressure air from passage 51, communication is established from pressure air supply passage 51 through connecting passages 53 and 54 and directly into the closed liquid container. This valve 56 has a stem 57 extending in relation substantially parallel to stem 49 and spaced therefrom.

A bearing standard 58 is carried by the case 46 intermediate the stems 49 and 57, and a rocking arm 59 is mounted upon the bearing standard 58 with its ends extending to bear against the outer ends of the stems 49 and 57. As illustrated in Fig. 4, bearing standard 58 may be adjustably mounted upon the pump case 46 intermediate the two stems 49 and 57, and thus the leverage imparted through this arm 59 from one stem to the other can be varied. These adjustments of the bearing standard 58 can be set through the medium of bolts or screws 60.

In the use of this modified construction, as the pressure air is supplied through passage 51 the pressure against the end 57 of valve 56 is sufficient to unseat this valve and thus open the air flow course through passages 53 and 54, in consequence of which compressed air is supplied to the container. This compressed air will build up a head in the upper part of the container to cause the liquid to rise and flow through the passage 45 and its associated tube or hose, in consequence of which liquid will be discharged from the container under pressure. As has been stated, it is desirable that the pressure be maintained relatively low, as compared with the ordinary pressure of compressed air supplies as usually available, and when the pressure is built up within the container the compressed air will flow through passage 50 from the container into the cylinder opening 47, and building up a pressure against the forward side of piston 48 will cause this piston to be moved upwardly within the cylinder opening, in consequence of which stem 49 is forced outwardly through the opening in the top of the case. As this stem 49 is in contact with one end of the arm 59, this arm 59 will be rocked about its mounting on the bearing standard 58 and will have its opposite end pressed down against valve stem 57 with sufficient force to seat this valve and consequently cut off the flow of air from pressure air supply passage 51 to the air passages 53 and 54. When the pressure within the container drops to reduce the pressure against the piston 48, the pressure of compressed air in the passage 51 against the end 57 of valve 56 will again cause this valve to be moved to an open position and the air pressure within the container will again be built up. The pump structure will operate automatically to maintain a substantially uniform low pressure within the container, and by adjusting the relative position of the bearing standard 58, it is possible to vary the pressure differential between the valve and the piston, and thus balance the parts for automatic operation at different air pressures within the container.

Figure 6:
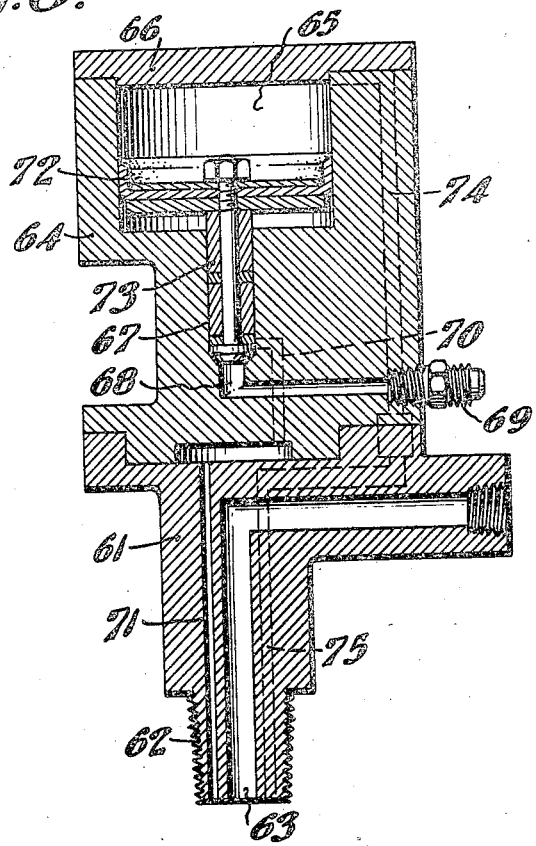
Fig. 6 is a vertical sectional view illustrating another modified construction.
Figure 7:
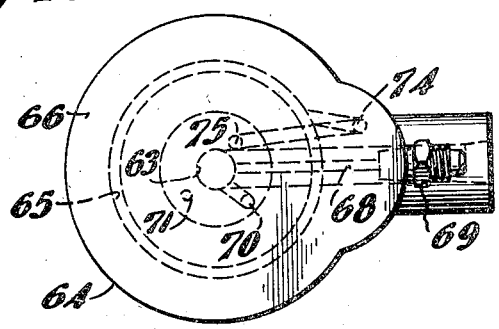
Fig. 7 is a top plan view of the form shown in Fig. 6.

The modified construction illustrated in Figs. 6 and 7 is also adaptable for use in substantially any connection, combination or adaptation, where it is desired to withdraw liquid from a closed container, and this construction is somewhat similar to the first described construction. With this modified form, the pump base 61 has a portion 62 to be attached to or connected with the container, and a liquid flow passage is provided at 63. Pump case 64 is mounted on the pump base 61 and has a cylinder opening 65 therein closed by a head 66. A valve cylinder 67 is formed in the pump case 64 substantially centrally in communication with the cylinder opening 65, and a pressure air passage 68 having a connection 69 to receive air from any suitable compressed air source, is extended to communicate with the inner end of the valve cylinder 67. A valve seat is provided at the inner end of the valve cylinder 67, and an air passage 70 leads from the valve cylinder 67 at a point spaced from the seat. An air passage 71 in the pump base 61 is in communication with air passage 70 and has its discharge end opening through the connecting portion 62 to thus discharge into the container. A piston 72 mounted for reciprocatory movement within the cylinder 65 has a valve 73 associated therewith and received for reciprocatory movement in valve cylinder 67, this valve 73 being provided with an end portion to fit the valve seat at the end of the valve cylinder. An air passage 74 is provided in the case 64 to open into the cylinder 65 at that end away from the valve cylinder opening 67, and a passage 75 in the pump base 61 is in communication with this passage 74. Through passages 75 and 74 direct communication is established from the interior of the container to the cylinder 65 on the outer side of piston 72.

The operation of the parts as illustrated in Figs. 6 and 7 is somewhat similar to the operation of the other forms as set forth above, but to recapitulate; when compressed air is supplied through passage 68 pressure is exerted against the end of the valve 73 sufficient to raise this valve from its seat and open the intake end of passage 70, and this compressed air flows through this passage 70 and the connected passage 71 into the container. In this way pressure is built up within the container sufficient to elevate and discharge liquid through the passage 63. When the pressure within the container has been raised to the desired predetermined pressure for actual pumping operation, the air pressure through passages 75 and 74 and against the head of piston 72 within the cylinder 65 will overbalance the pressure against the end of valve 73, in consequence of which the piston 35 and the valve will be moved downwardly to seat the valve and consequently close or cut off the supply of pressure air through passages 70 and 71 and to the container. When the pressure drops within the container the compressed air pressure against the end of valve 67 will overbalance the back pressure within cylinder 65, from the container, and in consequence the valve is again opened to permit supply of air to the container to build up the desired working pressure. Thus, the operation and function of the parts is automatic and the pump will continue to function at a substantially predetermined and uniform pressure of air within the container, irrespective of a relatively higher air pressure from the source of compressed air supply.

If desired, both of the modified forms of pump can have an air escape or safety valve similar to the valve 37 associated therewith.

As stated, the pump structure illustrated in Figs. 4 and 5 can be adjusted through relative movement or adjustment of the bearing standard 58, and it will be appreciated that variations in the relative pressure at which the other two forms of the pump will operate can be readily accomplished by varying the head areas of the valve and the piston. As the differential in diameter between the valve and piston is reduced, a relatively higher pressure will be permitted and maintained within the container, and the reverse.

From the foregoing it will be seen that I have provided a pump structure adapted to withdraw liquid from a closed container by the use of a governed and substantially uniform air pressure within the container, and that the working air pressure within the container will be maintained substantially constant and uniform at all times irrespective of a relatively higher source of compressed air supply and of variations in the pressure of the air supply. In describing the construction and operation I have, in each instance, referred to the operating fluid as compressed air, but it will of course be understood that any other suitable gas or operating fluid can be employed; and, in some adaptations it may be found desirable to employ a neutralizing gas or a gas which will otherwise be effective and adaptable to the particular liquid being handled. Obviously, where a light liquid is being pumped the operating pressure within the container can be maintained relatively lower than with a heavier liquid, and also the working pressure within the container can be varied to correspond with and compensate for the desired head at which the liquid is to be discharged or withdrawn from the container.

While I have herein shown and described only certain specific embodiments of my invention and have set forth only certain possible variations in the form, construction, arrangement, assembly and use of the parts, it will be appreciated that many changes and modifications can be made, to suit particular conditions of use, without departing from the spirit and scope of my invention.

I claim:

1. An air operated liquid dispensing device for use with a closed liquid container comprising, a casing structure connected with the container, a liquid discharge course from the casing structure for drawing off liquid, a pressure air course through the casing to supply air into the container, a source of pressure air supply to the air course, an air pressure controlled valve in the course, an air pressure controlled valve in the casing operable to close the pressure air course, and a valve air course in said casing leading from the container to the valve control means separated from the pressure air course and through which pressure is built up to close the valve in the pressure air course upon attainment of a desired pressure within the container.

2. An air operated liquid dispensing device for use with a closed liquid container comprising, a casing structure to be connected with the container, a liquid discharge course from the container, a draw-off control for said liquid discharge course, a pressure air supply course through said casing separated from the liquid discharge course and communicating with the interior of the container, a pressure air supply connected to said air course, an air pressure controlled valve in the casing operable to close the pressure air course, and a valve air course in said casing leading from the container to the valve control means separated from the pressure air course and through which pressure is built up to close the valve in the pressure air course upon attainment of a desired pressure within the container.

3. An air operated liquid pump for use with a closed liquid container comprising, a casing structure connected with the container, a liquid discharge course through the casing structure, liquid conducting means connecting with the inner end of the course to take liquid from the container, manually actuatable liquid discharge means connected with the outer end of the liquid course, a pressure air course through said casing out of communication with the liquid discharge course, a pressure air supply connected to the outer end of said pressure air course and the inner end of the course opening to discharge into the container, a valve in the pressure air course, a valve controlling air course through the casing structure from the container and separated from direct communication with the pressure air course and piston means associated with said valve opening said valve through pressure of the pressure air supply and closing said valve upon attainment of a relatively lower pressure within the container and through said valve controlling air course.

4. An air operated liquid pump for use with a closed liquid container comprising, a casing structure connected with the container, a liquid discharge course through the casing structure, liquid conducting means connecting with the inner end of the course to take liquid from the container, manually actuatable liquid discharge means connected with the outer end of the liquid course, a pressure air course through said casing out of communication with the liquid discharge course, a pressure air supply connected to the outer end of said pressure air course and the inner end of the course opening to discharge into the container, a valve in the pressure air course, a valve controlling air course through the casing structure from the container and separated from direct communication with the pressure air course, piston means associated with said valve opening said valve through pressure of the pressure air supply and closing said valve upon attainment of a relatively lower pressure within the container and through said valve controlling air course, and means associated with said casing structure to guard against accidental creation of excessive pressure within the container.

5. An air operated liquid dispensing device for use with a closed liquid container comprising, a casing structure, a base structure associated with the casing structure having means for attachment to the container, said base structure being provided with a lateral extension and having a liquid discharge passage therethrough to communicate with the container, a liquid supply conducting means connected with the inner end of the liquid passage to take liquid from the container, a manually controlled liquid dispensing faucet connected with the outer end of the liquid passage, a pressure air supply connection to said pump casing structure, a pressure air conducting passage from said supply through the casing and base structures to discharge into the container, valve means in the air passage opened by pressure air supply and closed by the pressure of air within the container to control the supply of air to the container, and a valve closing air conducting passage opening from the interior of the container and separated from the pressure air passage.

6. An air operated liquid dispensing device for use with a closed liquid container comprising, a casing structure, a base structure associated with the casing structure having means for attachment to the container, said base structure being provided with a lateral extension and having a liquid discharge passage therethrough to communicate with the container, a liquid supply conducting means connected with the inner end of the liquid passage to take liquid from the container, a manually controlled liquid dispensing faucet connected with the outer end of the liquid passage, a pressure air supply connection to said pump casing structure, a pressure air conducting passage from said supply through the casing and base structures to discharge into the container, valve means in the air passage opened by pressure air supply and closed by the pressure of air within the container to control the supply of air to the container, and a valve closing air conducting passage opening from the interior of the container and separated from the pressure air passage and blow-off means associated with the base structure to guard against excessive fluid pressure within the container.

7. With a closed liquid container, an air operated liquid dispensing device comprising, a case structure connected in communication with the interior of the container and having air passages and a liquid discharge passage therethrough in communication with the interior of the container, a liquid conducting connection to supply liquid from the container to the inner end of the liquid passage, a manually controlled dispensing faucet connected with the outer end of the liquid discharge passage, said pump casing being provided with a cylindrical opening and having one of the air passages in communication with said cylindrical opening, a pressure air supply connected to the casing structure communicating with the outer end of the other of said air passages, a valve in the pressure air passage opened by the pressure of air from the supply, and a piston in the cylinder associated with the valve to close said valve upon attainment of a maximum desired air pressure within the container.

8. With a closed liquid container, an air operated liquid dispensing device comprising, a case structure connected in communication with the interior of the container and having air passages and a liquid discharge passage therethrough in communication with the interior of the container, a liquid conducting connection to supply liquid from the container to the inner end of the liquid passage, a manually controlled dispensing faucet connected with the outer end of the liquid discharge passage, said pump casing being provided with a cylindrical opening and having one of the air passages in communication with said cylindrical opening, a pressure air supply connected to the casing structure communicating with the outer end of the other of said air passages, a valve in the pressure air passage opened by the pressure of air from the supply, a piston in the cylinder associated with the valve to close said valve upon attainment of a maximum desired air pressure within the container, and an adjustable blow-off connected with one of the air passages to guard against creation of excessive pressures within the container.

9. In combination with a closed liquid container, an air operated liquid dispensing device connected with the container having an air inlet passage to the upper part of the container and a liquid discharge submerged in the liquid, a compressed air supply connection to said air passage, a valve in said air passage normally opened by the compressed air supply, air pressure operated means to close said valve and cut off the supply of compressed air upon attainment of a maximum desired pressure within the container, and an air conducting passage leading from the container to the air operated valve closing means and separated from the air inlet passage.

10. In combination with a closed liquid container, an air operated liquid dispensing device connected with said container having an air inlet passage to supply air to the container and a liquid discharge passage through which liquid is discharged from the container under the pressure of air supplied thereto, a pressure air supply connection to said air passage, a valve in said air inlet passage normally opened by the pressure of air through said passage, air pressure actuated piston means to close said valve upon attainment of a predetermined pressure within the container, and an air conducting passage leading from the container to said piston means and separated from the pressure air inlet passage.

11. In combination with a closed liquid container, an air operated liquid dispensing device connected with said container having an air inlet passage to supply air to the container and a liquid discharge passage through which liquid is discharged from the container under the pressure of air supplied thereto, a pressure air supply connection to said air passage, a valve in said air inlet passage normally opened by the pressure of air through said passage, air pressure actuated piston means to close said valve upon attainment of a predetermined pressure within the container, an air conducting passage leading from the container to said piston means and separated from the pressure air inlet passage, and means to vary the proportionate pressures at which the valve is opened and closed.

12. With a closed liquid container, an air operated liquid dispensing device casing connected with said container and having a pressure air inlet passage therethrough leading to the container and a liquid discharge passage therethrough leading from said container to a point of discharge, a valve movably mounted in the casing to control the passage of pressure air, a cylinder opening in said case adjacent to the mounting of the valve, a piston in said cylinder opening connected to move the said valve, said valve being normally opened by the force of pressure air thereagainst and the piston being of relatively larger size than the pressure receiving portion of the valve, and a valve air controlling passage leading from the container to said cylinder to conduct air at the pressure within the container to close said valve and cut off the supply of pressure air when a desired predetermined air pressure has been attained in the container.

GEORGE SCHULZ.